United States Patent
Kwon et al.

(10) Patent No.: US 10,652,243 B2
(45) Date of Patent: May 12, 2020

(54) METHOD AND DEVICE FOR CONTROLLING DEVICE BY USING BLUETOOTH LOW ENERGY (LE) TECHNIQUE

(71) Applicant: LG ELECTRONICS INC., Seoul (KR)

(72) Inventors: Younghwan Kwon, Seoul (KR); Minsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 286 days.

(21) Appl. No.: 15/508,784

(22) PCT Filed: Sep. 4, 2015

(86) PCT No.: PCT/KR2015/009375
§ 371 (c)(1),
(2) Date: Mar. 3, 2017

(87) PCT Pub. No.: WO2016/036206
PCT Pub. Date: Mar. 10, 2016

(65) Prior Publication Data
US 2017/0279808 A1    Sep. 28, 2017

Related U.S. Application Data

(60) Provisional application No. 62/046,125, filed on Sep. 4, 2014.

(51) Int. Cl.
G06F 15/173    (2006.01)
H04L 29/06    (2006.01)
(Continued)

(52) U.S. Cl.
CPC ............... *H04L 63/10* (2013.01); *H04W 8/00* (2013.01); *H04W 8/005* (2013.01); *H04W 12/08* (2013.01);
(Continued)

(58) Field of Classification Search
CPC .............................. H04L 63/10; H04W 76/10
(Continued)

(56) References Cited

U.S. PATENT DOCUMENTS 9,439,197 B1 * 9/2016 Ngo ........................ H04W 16/14
2005/0058108 A1 * 3/2005 Ekberg ................. H04W 48/14
370/338
(Continued)

FOREIGN PATENT DOCUMENTS

KR    10-0726622 B1    6/2007
KR    10-2009-0124588 A    12/2009
(Continued)

OTHER PUBLICATIONS

Townsend, Kevin "GATT|Introduction to Bluettoh Low Energy/Adafruit Learning System", Mar. 20, 2014, pp. 2-7 (Year: 2014).*

*Primary Examiner* — Anthony Mejia
(74) *Attorney, Agent, or Firm* — Birch, Stewart, Kolasch & Birch, LLP

(57) ABSTRACT

Disclosed is a method and device for controlling a connection between a first device and a second device by using Bluetooth LE (Low Energy) technology. The method comprises: receiving from the first device an advertising message including information related to a service for controlling the first device; connecting with the first device based on the advertising message; requesting the connected first device for information on one or more devices included in a Whitelist, which is indicating a list of device the first device can connect to; receiving the information on one or (Continued)

more devices from the first device; and instructing the first device to connect with the second device when the information on one or more devices includes the second device's information.

18 Claims, 26 Drawing Sheets

(51) Int. Cl.
- *H04W 76/10* (2018.01)
- *H04W 8/00* (2009.01)
- *H04W 12/08* (2009.01)
- *H04W 4/80* (2018.01)

(52) U.S. Cl.
CPC ............. *H04W 76/10* (2018.02); *H04L 63/04* (2013.01); *H04L 63/101* (2013.01); *H04L 63/102* (2013.01); *H04W 4/80* (2018.02)

(58) Field of Classification Search
USPC .......................................................... 709/225
See application file for complete search history.

(56) References Cited

U.S. PATENT DOCUMENTS

| | | | |
|---|---|---|---|
| 2005/0058109 A1* | 3/2005 | Ekberg | H04L 29/12113 370/338 |
| 2011/0021142 A1* | 1/2011 | Desai | H04W 8/005 455/41.2 |
| 2012/0102409 A1* | 4/2012 | Fan | H04W 4/00 715/738 |
| 2012/0171961 A1* | 7/2012 | Qi | H04L 63/0869 455/41.2 |
| 2012/0195387 A1 | 8/2012 | Masuda | |
| 2012/0258665 A1* | 10/2012 | Sip | H04W 84/18 455/41.2 |
| 2012/0276912 A1* | 11/2012 | Zhang | H04W 76/10 455/450 |
| 2013/0157568 A1* | 6/2013 | Jain | H04W 4/80 455/41.2 |
| 2013/0182798 A1 | 7/2013 | Lozano | |
| 2013/0288604 A1* | 10/2013 | Chang | H04W 84/18 455/41.2 |
| 2013/0346494 A1* | 12/2013 | Nakfour | H04L 67/1095 709/204 |
| 2014/0087665 A1* | 3/2014 | Yang | H04W 8/005 455/41.2 |
| 2014/0155031 A1* | 6/2014 | Lee | H04W 4/20 455/411 |
| 2014/0220894 A1* | 8/2014 | Chen | H04W 8/005 455/41.2 |
| 2014/0280941 A1* | 9/2014 | Maguire | H04L 67/10 709/225 |
| 2014/0302785 A1* | 10/2014 | Arora | H04W 4/008 455/41.2 |
| 2014/0335902 A1* | 11/2014 | Guba | H04W 4/48 455/456.4 |
| 2014/0355582 A1* | 12/2014 | Kamath | H04W 84/20 370/338 |
| 2015/0078197 A1* | 3/2015 | Ding | H04W 48/16 370/254 |
| 2015/0223157 A1* | 8/2015 | Ghosh | H04W 48/18 370/315 |
| 2015/0256545 A1* | 9/2015 | Dotterer, III | H04L 63/10 726/1 |
| 2015/0296020 A1* | 10/2015 | Granqvist | H04W 76/14 455/41.2 |
| 2015/0371026 A1* | 12/2015 | Gnanasekaran | G06F 21/35 726/7 |
| 2016/0088064 A1* | 3/2016 | Chen | H04M 1/7253 709/204 |
| 2017/0048680 A1* | 2/2017 | Chuang | H04W 4/80 |

FOREIGN PATENT DOCUMENTS

| | | | | |
|---|---|---|---|---|
| WO | WO-2008124796 A1 * | 10/2008 | ........... | H04W 16/14 |
| WO | WO 2014/021605 A1 | 2/2014 | | |

* cited by examiner

[FIG. 1]
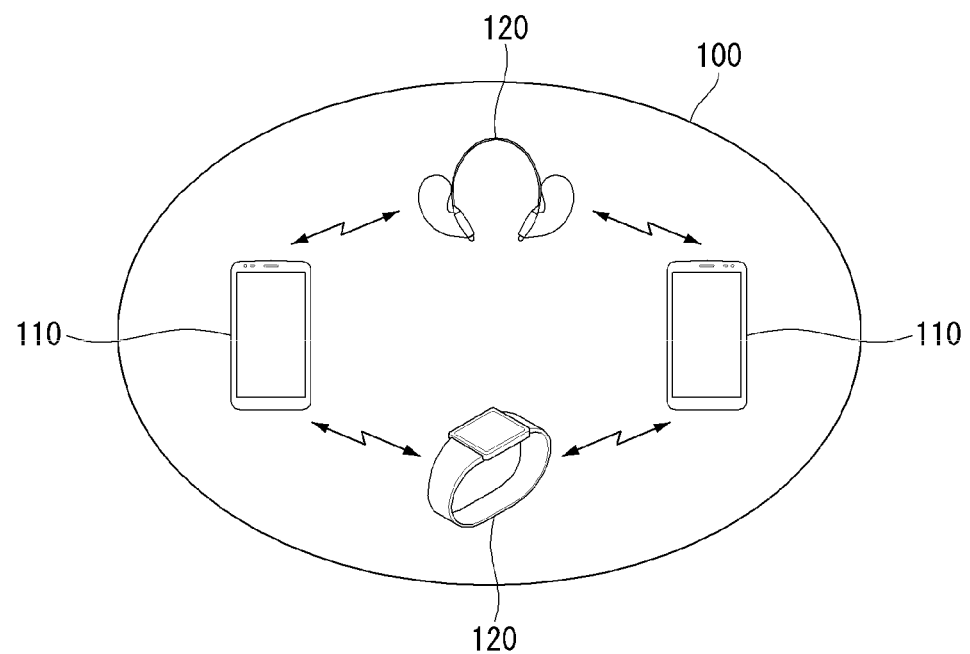

[FIG. 2]
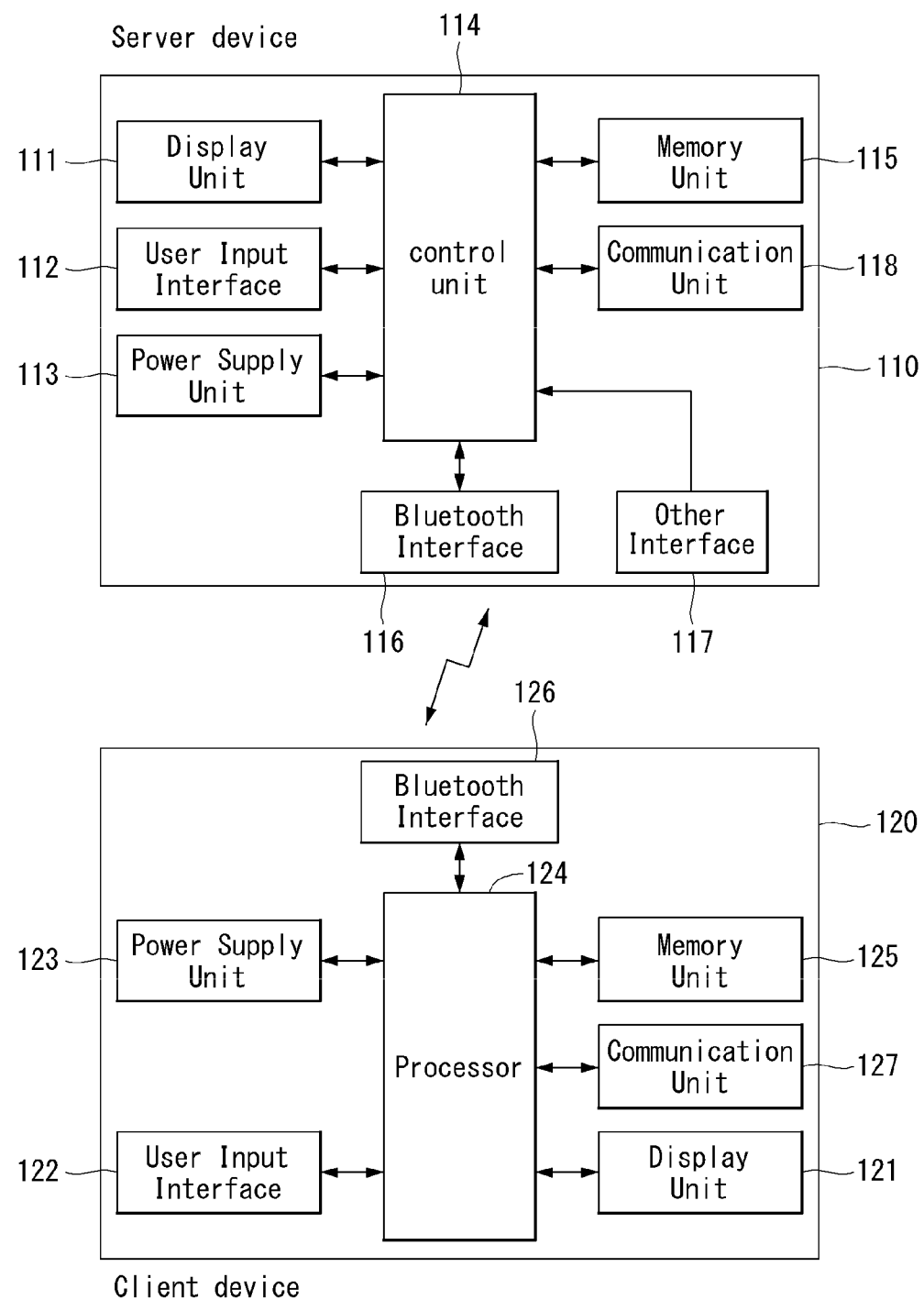

[FIG. 3]
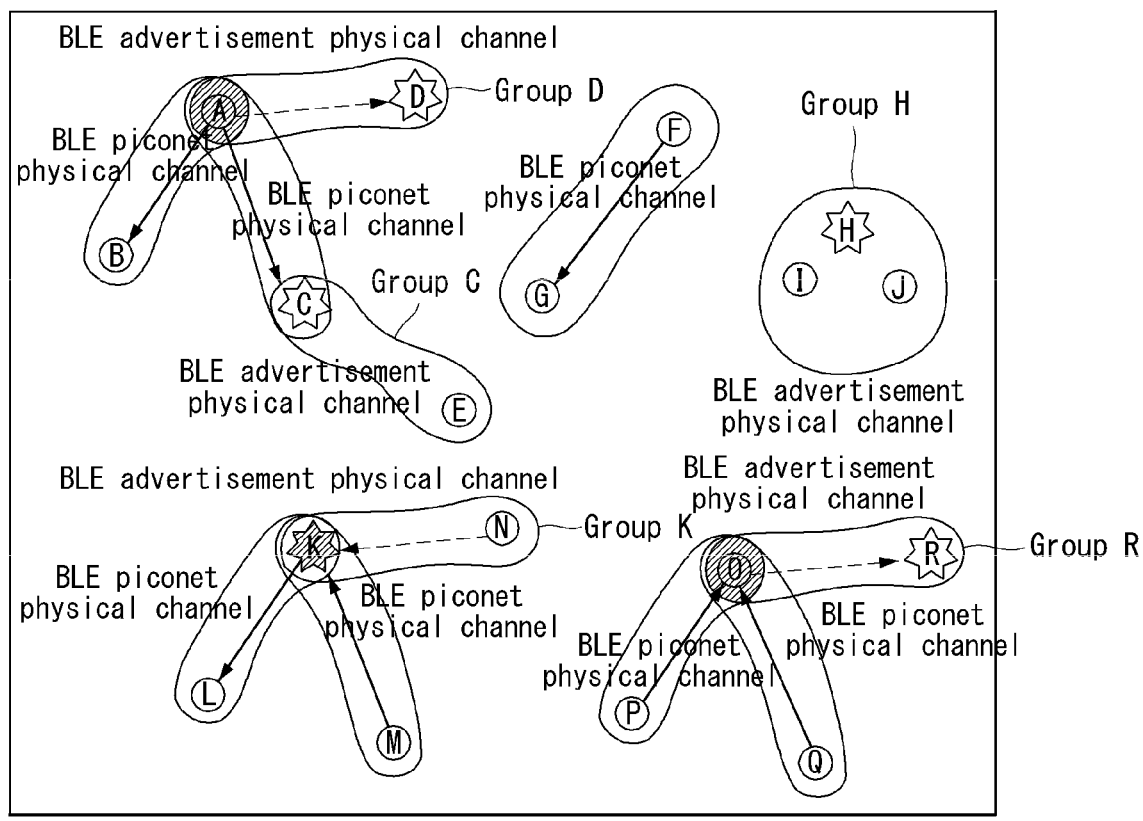

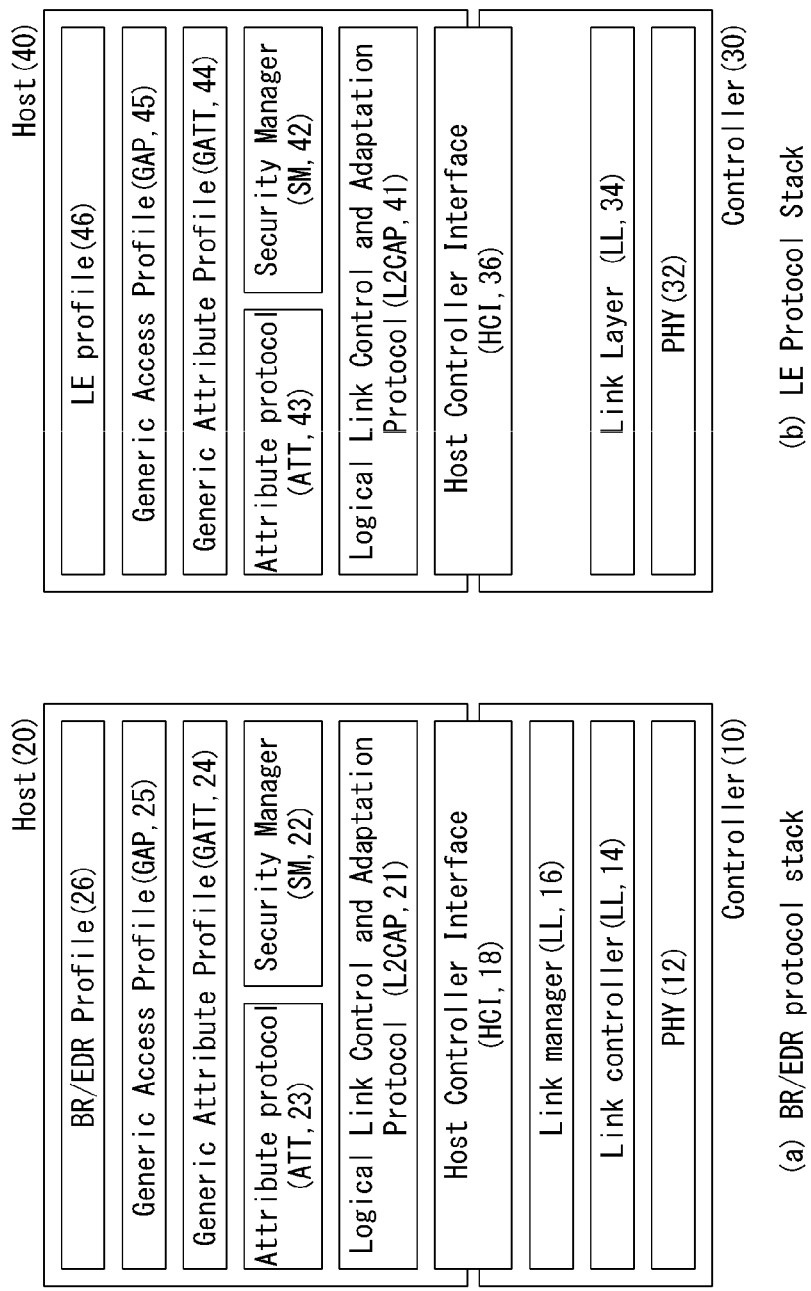
[FIG. 4]

[FIG. 5]
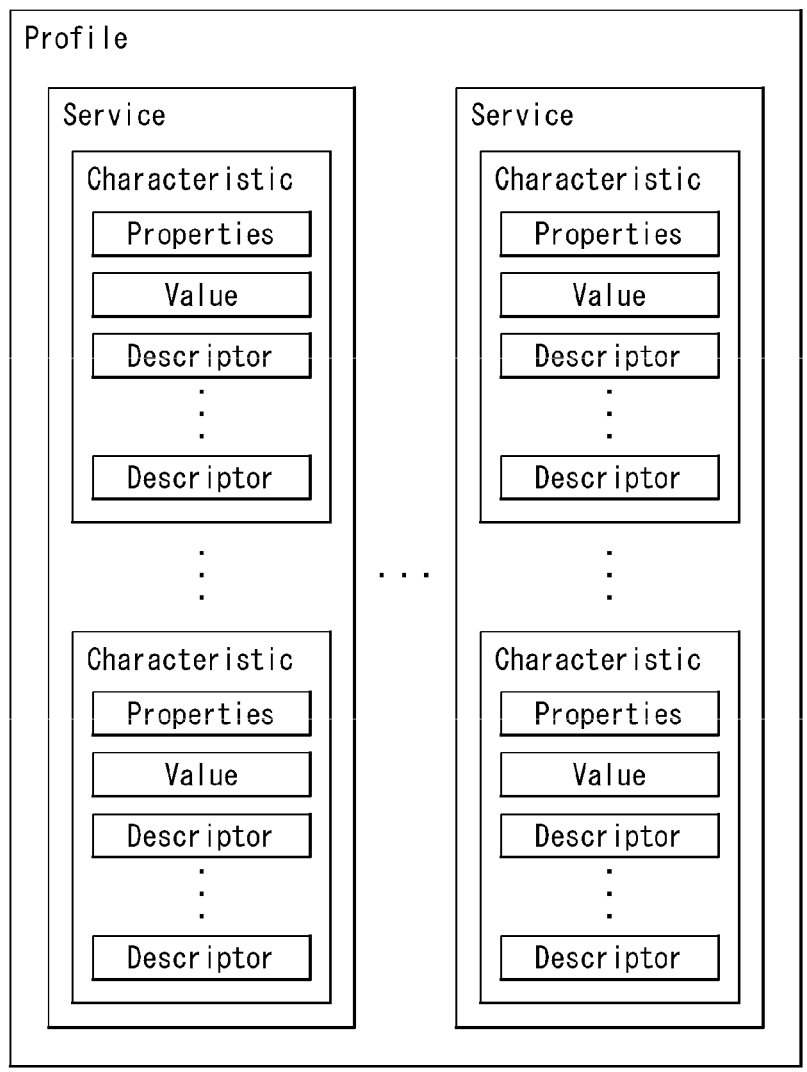

[FIG. 6]
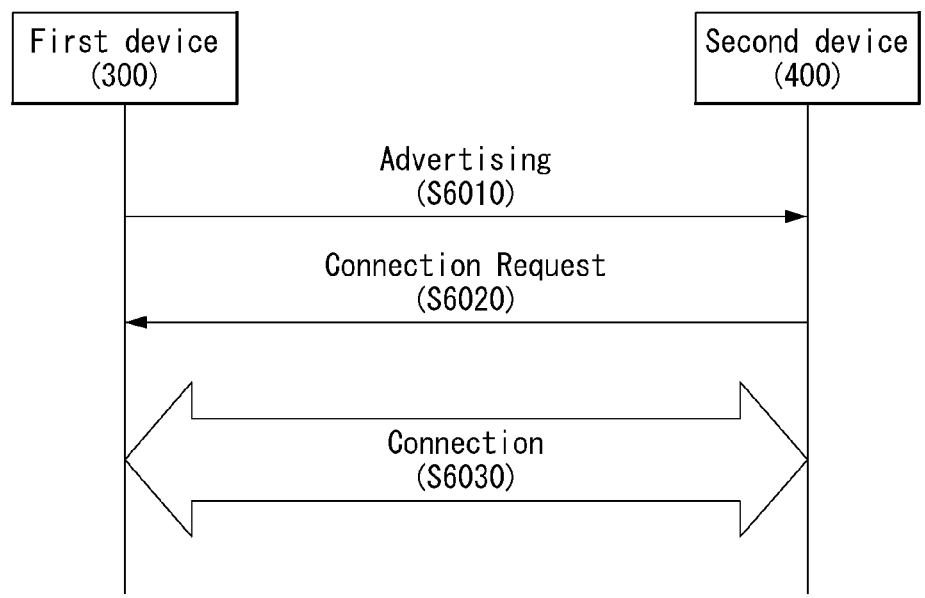

[FIG. 7]
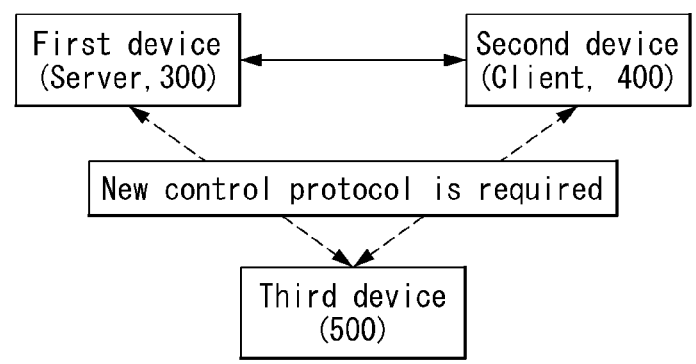

[FIG. 8]

| Characteristic Name | Requirement | Mandatory Properties |
|---|---|---|
| Device State | M | Read, Write, Indication |
| Advertising Duration | O | Read, Write |
| Scanning Duration | O | Read, Write |
| Standby Duration | O | Read, Write |
| Initiating Duration | O | Read, Write |
| Advertising Type | O | Read, Write |
| Scanning Type | O | Read, Write |
| Device State Control Point | O | Read, Indication |
| WhiteList | O | Read, Write, Indication |
| WhiteList Control Point | O | Read, Write, Indication |
| Advertising Filter Policy | | Read, Write, Indication |
| Scanning Filter Policy | | Read, Write, Indication |
| Initiator Filter Policy | | Read, Write, Indication |
| Connected Service Type | O | Read, Write, Indication |
| Channel Info | | Read, Write, Indication |

Charcteristic

| Data Type | Type | Description |
|---|---|---|
| Current Device State | 8 bits Integer | Current Device State in which the device is operated now |
| Operated Device State | 8 bits Integer | Operated Device States among which the device can be operated among |

(a) Types of Device State Information

| 7th bit | 6th bit | 5th bit | 4th bit | 3rd bit | 2nd bit | 1st bit | 0th bit |
|---|---|---|---|---|---|---|---|
| Mode | | | Connecting | initiating | Advertising | Standby | Scanning |

(b) Format of Device State

| Characteristic | Type | Description |
|---|---|---|
| Scanning Duration | 32 bits Integer | Operation Duration for Scanning state |
| Standby Duration | 32 bits Integer | Operation Duration for Standby state |
| Advertising Duration | 32 bits Integer | Operation Duration for Advertising state |
| Initiating Duration | 32 bits Integer | Operation Duration for Initiating state |
| Connecting Duration | 32 bits Integer | Operation Duration for Connecting state |

(a) Duration

| 31th bit | 30th bit | 29th bit ~ 0th bit |
|---|---|---|
| Mode | | Time values (e.g. milliseconds) |

(b) Format of Duration

[FIG. 11]

| Characteristic | Type | Description |
|---|---|---|
| Advertising Interval | 32 bits Integer | Value for setting interval of Advertising Event (advDelay is determined by the system). Multiples of the smallest unit. |
| Advertising Duration | 32 bits Integer | Time during which device performs advertising (including multiple Advertising Windows). |
| Number of Advertising Events | 32 bits Integer | Operation Duration for Advertising state |
| Advertising Channel | 8 bits | 37, 38, or 39 advertising channels are used (advertising channels are allocated by bitwise operations). |

Advertising Parameter

[FIG. 12]

| Characteristic | Type | Description |
|---|---|---|
| Scanning Interval | 32 bits Integer | Value for setting the interval of Scanning Event (advDelay is determined by the system).<br>Multiples of the smallest unit. |
| Scanning Window | 32 bits Integer | Time during which device performs Scanning.<br>Its value is smaller than Scanning Interval. |
| Scanning Duration | 32 bits Integer | Time during which device performs Scanning (which may include multiple Scanning Events). |
| Number of Scanning Events. | 32 bits Integer | Number of times Scanning Event is performed |
| Scanning Channel | 8 bits | 37, 38, or 39 advertising channels are used (advertising channels are allocated by bitwise operations). |

Scanning Parameter

| 7th bit | 6th bit | 5th bit | 4th bit | 3rd bit | 2nd bit | 1st bit | 0th bit |
|---|---|---|---|---|---|---|---|
| Advertising | Scanning | Random | Sequential (Reverse) | Sequential | 39th CH | 38th CH | 37th CH |

Channel Info.

| Characteristic | Type | Description |
|---|---|---|
| Peer Device | 48 bits | Identifier of device to connect with (It may be the device's address) |
| Connection Interval | 32 bits Integer | Value for setting the interval of Connection Event (advDelay is determined by the system). Multiples of the smallest unit. |
| Connection Window | 32 bits Integer | Time during which device creates Connection Event and sends data. Its value is smaller than Scanning Interval. |
| Connection Slave latency | 8 bits Integer | Time during which device creates Connection Event and sends data. Its value is smaller than Scanning Interval. |
| Connection Supervision Timeout | 8 bits Integer | Terminates connection if no data is sent and received during a certain number of connection intervals |
| Connection Duration | 32 bits Integer | Time during which device maintains connection (it may include multiple Connection Events). |
| Number of Connection Events | 32 bits Integer | Number of times Connection Event is performed |
| Data Channel | 42 bits | Provides information on available channels among 0th to 36th data channels. Provides more channel information than Advertising Channel information |

Connection Parameter

| 7th bit | 6th bit | 5th bit | 4th bit | 3rd bit | 2nd bit | 1st bit | 0th bit |
|---|---|---|---|---|---|---|---|
| RFU | | | | Non-Connected Undirected Event | Scannable Undirected Event | Connectable Directed Event | Connectable Undirected Event |

(a) Advertising Type

| 7th bit | 6th bit | 5th bit | 4th bit | 3rd bit | 2nd bit | 1st bit | 0th bit |
|---|---|---|---|---|---|---|---|
| RFU | | | | | | Passive Scanning | Active Scanning |

(b) Scanning Type

| 0x01 | 0x02 | 0x03 | 0x04 | 0x05 | 0x06 | 0x07 | 0x08 | 0x09 |
|---|---|---|---|---|---|---|---|---|
| Execute | Advertising Start | Advertising Stop | Scanning Start | Scanning Stop | Initiating Request | Initiating Stop | Refresh Bonding | Refresh Security |

Device Status Control Point

| 0x01 | 0x02 | 0x03 | 0x04 | 0x05 | 0x06 | 0x07 | 0x08 | 0x09 |
|---|---|---|---|---|---|---|---|---|
| Clear Whitelist | Add one device in Whitelist | Delete one device in Whitelist | Send Whitelist | Receive Whitelist | | | | |

Whitelist Control Point

[FIG. 17]

| 7th bit | 6th bit | 5th bit | 4th bit | 3rd bit | 2nd bit | 1st bit | 0th bit |
|---|---|---|---|---|---|---|---|
| RFU | | | | Used for Advertisement when initiating | Used for Advertisement when scanning | Used for Connection Request when advertising | Used for Scan Request when advertising |

Filter Policy

[FIG. 18]

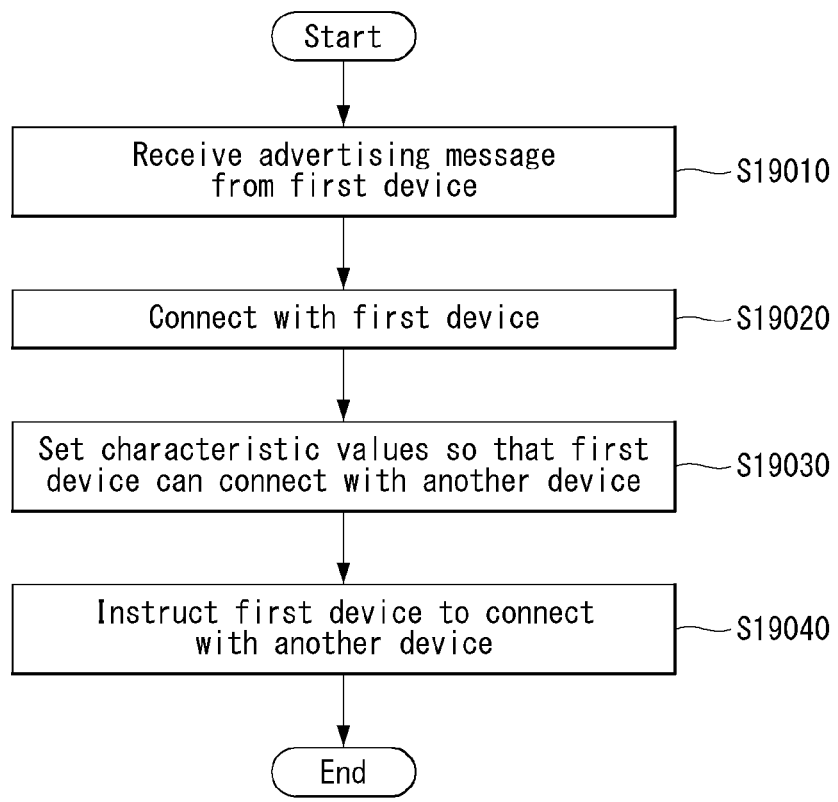
[FIG. 19]

[FIG. 20]
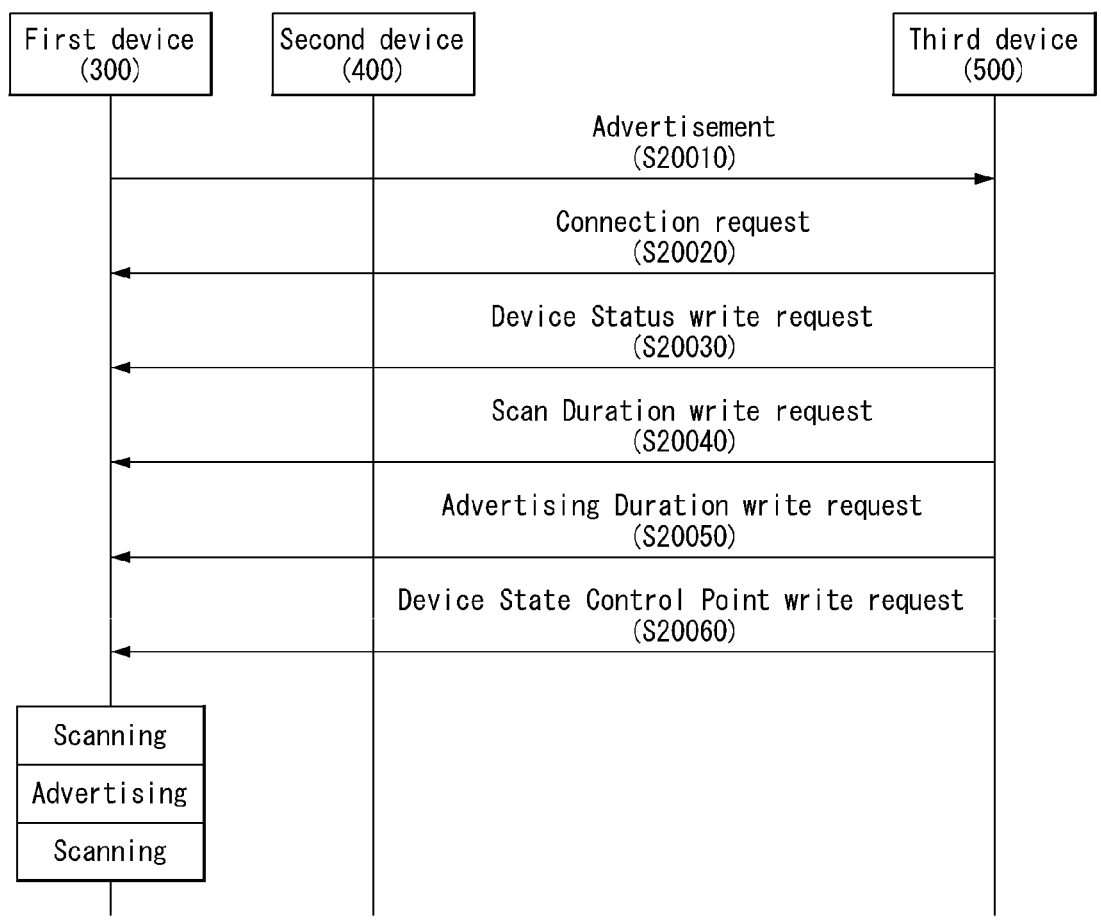

[FIG. 21]
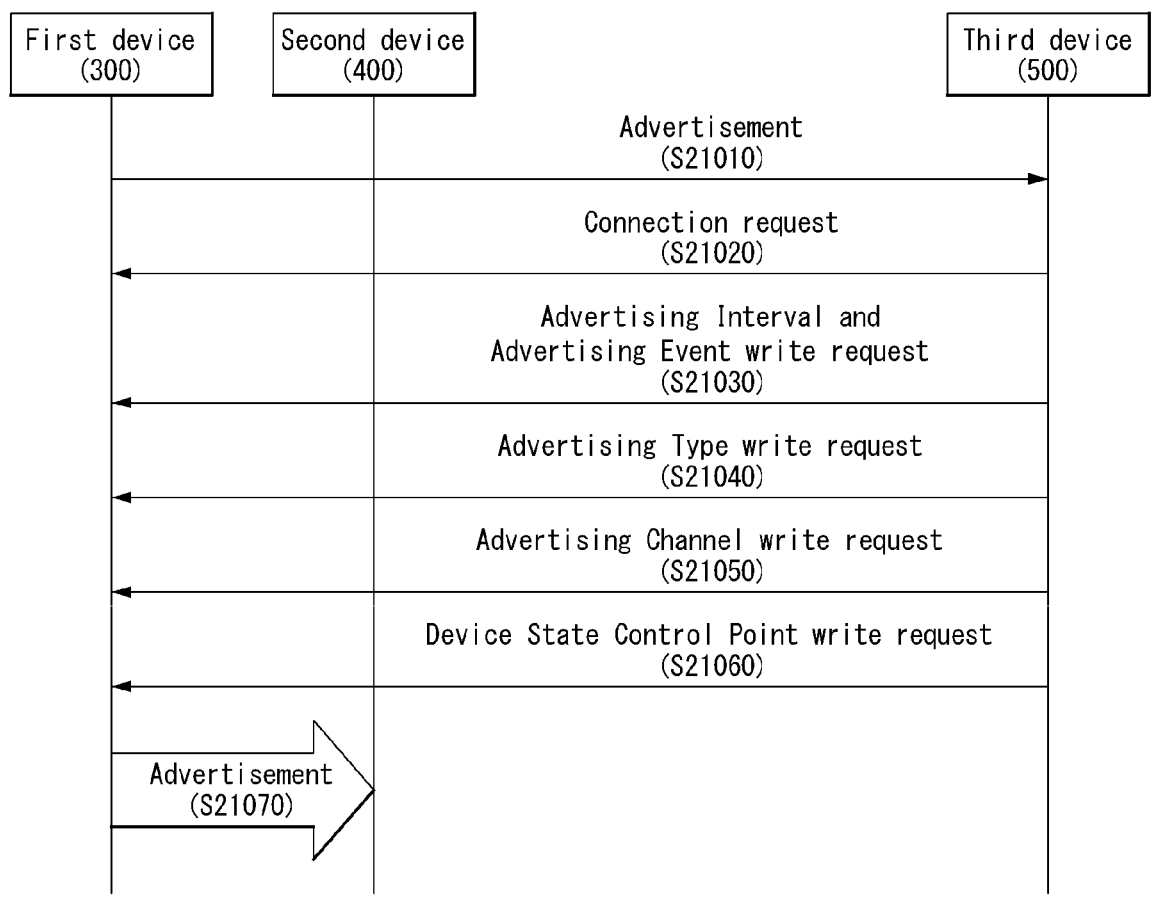

[FIG. 22]
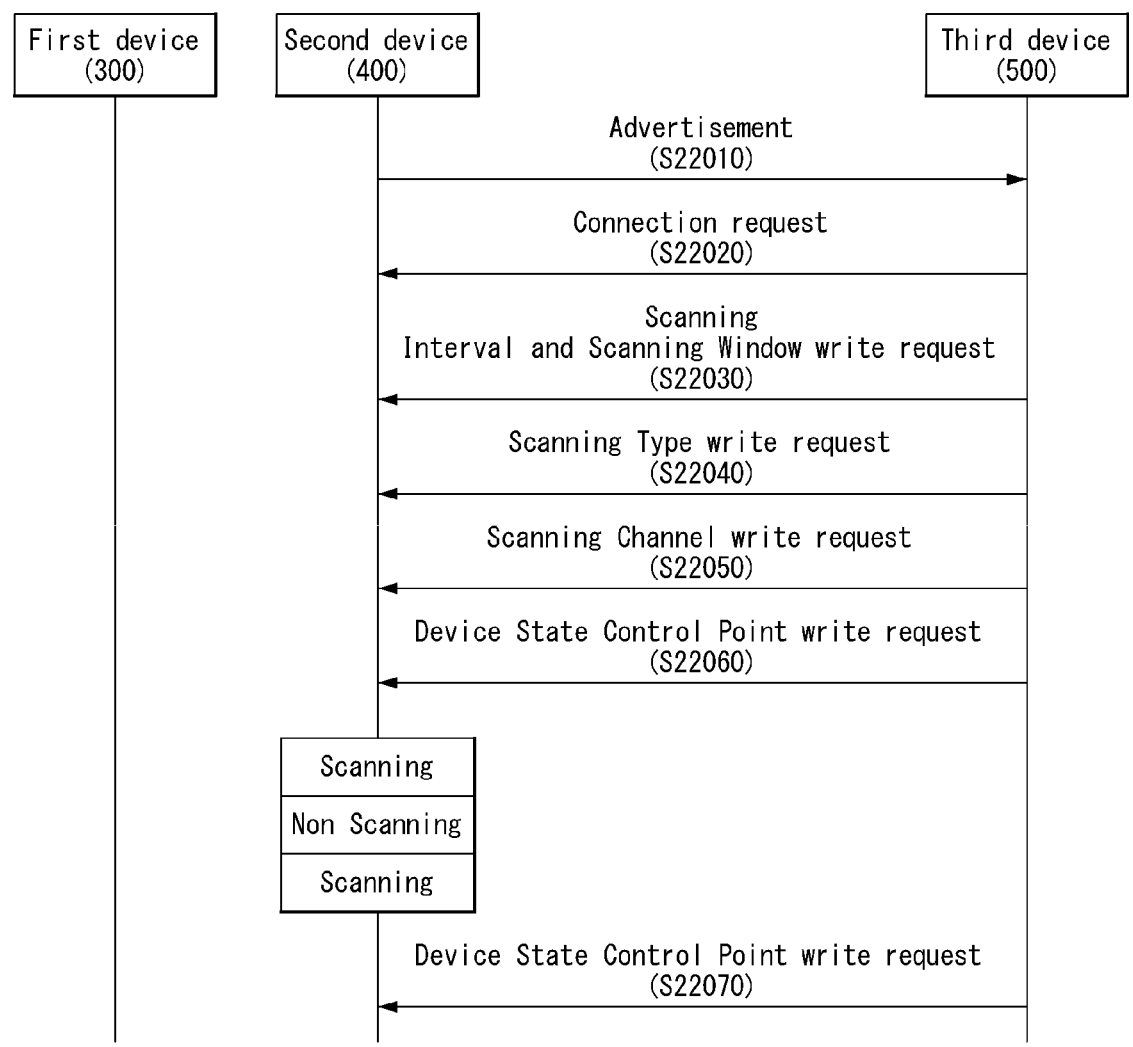

[FIG. 23]
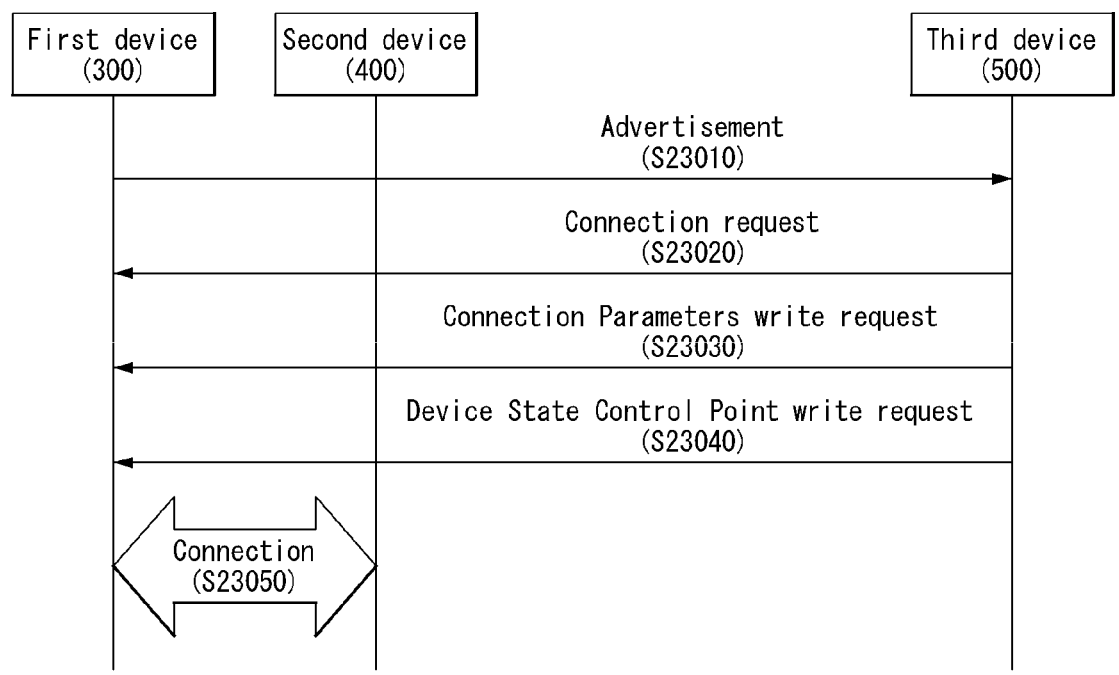

[FIG. 24]
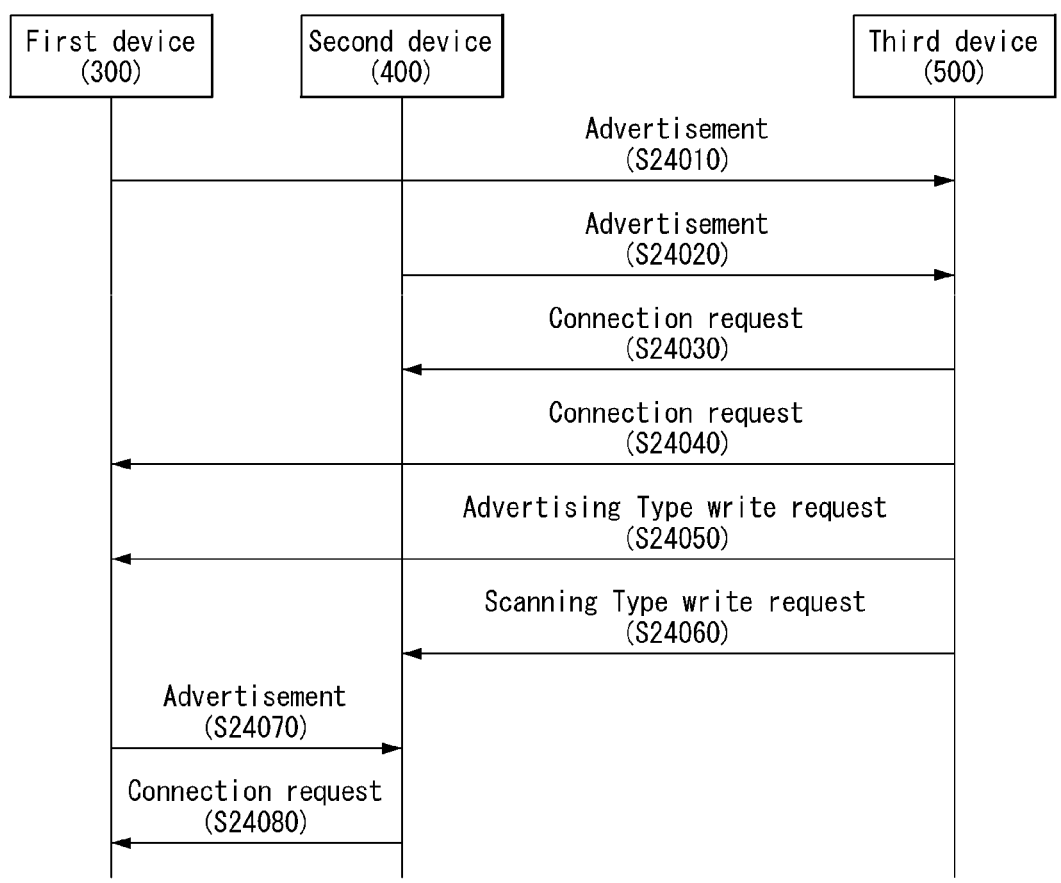

[FIG. 25]
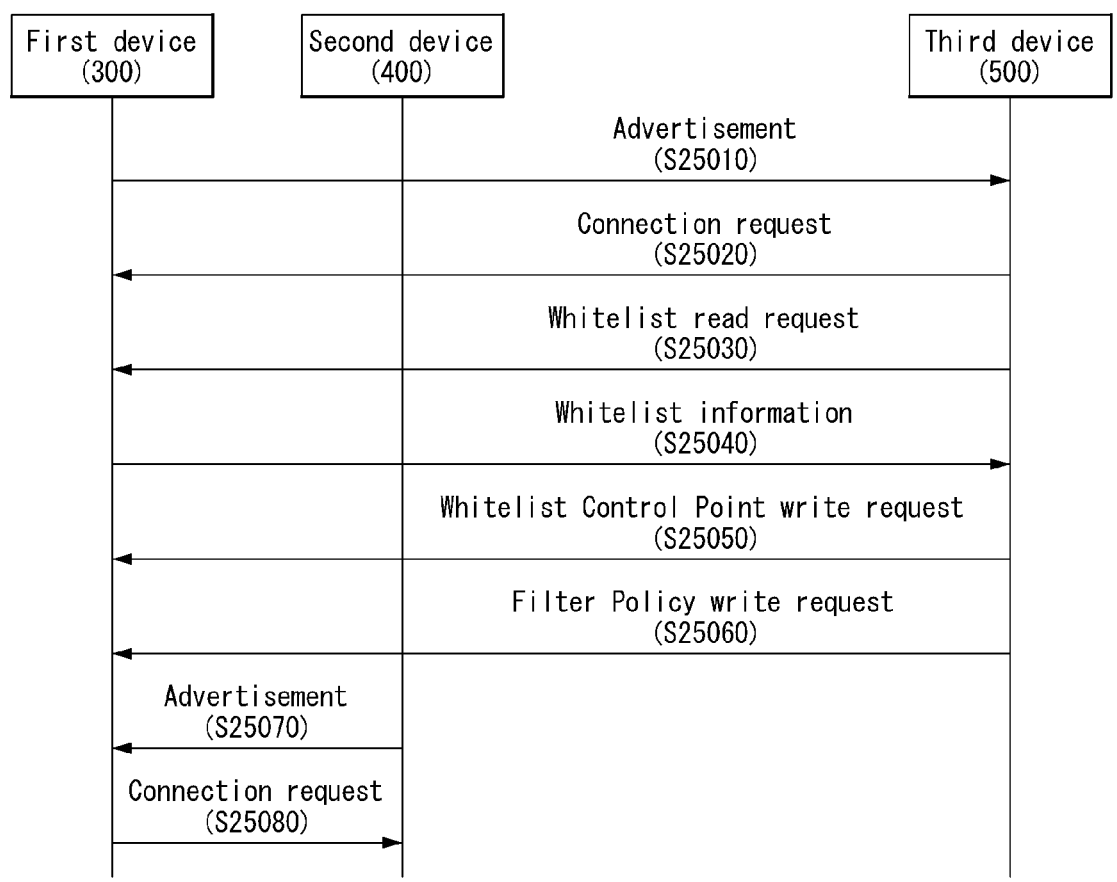

[FIG. 26]
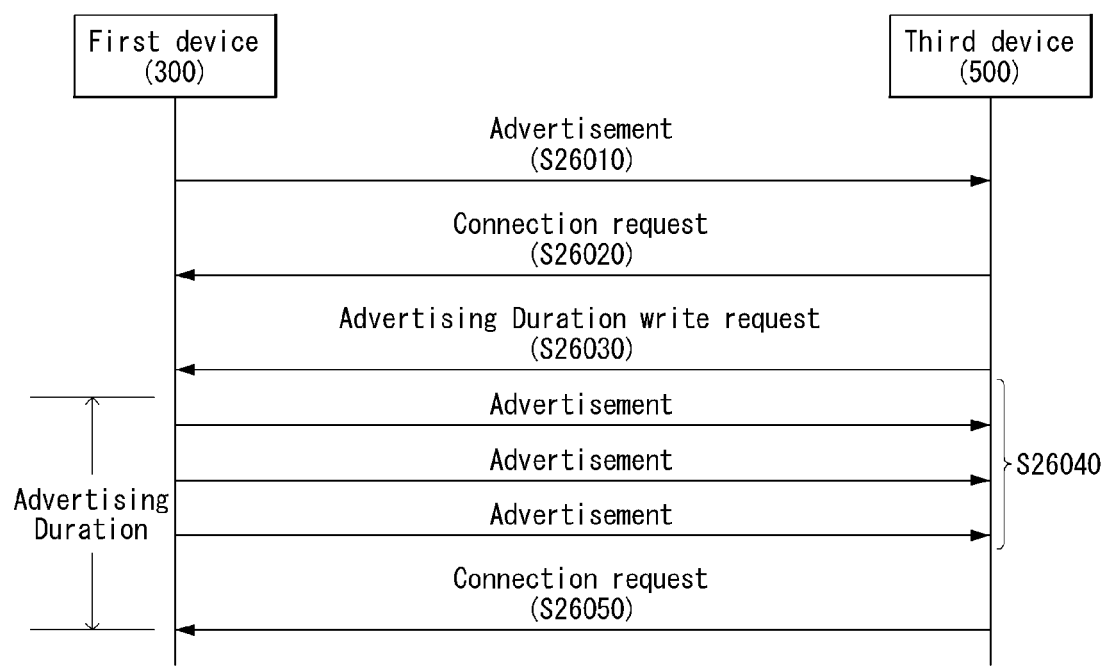

METHOD AND DEVICE FOR CONTROLLING DEVICE BY USING BLUETOOTH LOW ENERGY (LE) TECHNIQUE

CROSS REFERENCE TO RELATED APPLICATIONS

This application is the National Phase of PCT International Application No. PCT/KR2015/009375, filed on Sep. 4, 2015, which claims priority under 35 U.S.C. 119(e) to U.S. Provisional Application No. 62/046,125, filed on Sep. 4, 2014, all of which are hereby expressly incorporated by reference into the present application.

TECHNICAL FIELD

The present invention relates to a method and device for forming a device-to-device connection in a wireless communication system by using Bluetooth, a short-range technology, and more particularly, to a method and device for controlling a device-to-device connection by using Bluetooth Low Energy (BLE) technology.

BACKGROUND ART

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

One aspect of the present invention is to provide a method for controlling a device by using Bluetooth LE (Low Energy) technology.

Another aspect of the present invention is to provide a method for controlling a device's connection by using Bluetooth LE (Low Energy) technology.

Yet another aspect of the present invention is to provide a method for controlling a device's connection by changing the settings of a Whitelist, which is a list of devices the device can cannot to, by using Bluetooth LE (Low Energy) technology.

A further aspect of the present invention is to provide a method for controlling a device's connection by setting a stage for applying a Whitelist, which is a list of devices the device can cannot to, by using Bluetooth LE (Low Energy) technology.

A further aspect of the present invention is to provide a method for controlling a device's connection by changing the parameter settings of messages sent by the device by using Bluetooth LE (Low Energy) technology.

Technical problems to be solved by the present invention are not limited to the above-mentioned technical problems, and other technical problems not mentioned above can be clearly understood by one skilled in the art from the following description.

Technical Solution

The present invention has been made in an effort to provide a method for controlling a connection between a first device and a second device by using Bluetooth LE (Low Energy) technology.

An exemplary embodiment of the present invention provides a method for controlling a connection between a first device and a second device by using Bluetooth LE (Low Energy) technology, the method comprising: receiving from the first device an advertising message including information related to a service for controlling the first device; connecting with the first device based on the advertising message; requesting the connected first device for information on one or more devices included in a Whitelist, which is indicating a list of device the first device can connect to; receiving the information on one or more devices from the first device; and instructing the first device to connect with the second device when the information on one or more devices includes the second device's information.

Furthermore, the advertising message may further include role information indicating the role of the first device when performing a connection with the second device.

Furthermore, the method may further comprise, requesting the first device to add the second device's information to the Whitelist when the information on one or more devices does not include the second device's information.

Furthermore, the method may further comprise instructing Instructing the first device to transmit an advertising message, a scan request message for requesting additional information on the second device, or a connection request message for connecting with the second device.

Furthermore, the method may further comprise setting the type of an advertising message the first device transmits to the second device.

Furthermore, the method may further comprise setting the parameter of an advertising message the first device transmits to the second device.

Furthermore, the parameter may include at least one of the duration for which the advertising message is transmitted, the interval of transmissions of the advertising message, or the channels over which the advertising message is transmitted.

Furthermore, the method may further comprise setting the parameter of a scan request message the first device transmits to the second device in order to request for additional information on the second device.

Furthermore, the parameter may include at least one of the duration for which the scan request message is transmitted, the interval of transmissions of the scan request message, or the channels over which the scan request message is transmitted.

Another exemplary embodiment of the present invention provides a third device for controlling a connection between a first device and a second device by using Bluetooth LE (Low Energy) technology, the third device comprising: a communication unit for communicating with external devices in a wireless or wired manner; and a processor functionally connected to the communication unit, wherein the processor receives from the first device an advertising message including information related to a service for controlling the first device, connects with the first device based on the advertising message, requests the connected first device for information on one or more devices included in a Whitelist, which is indicating a list of device the first device can connect to, receives the information on one or more devices from the first device, and instructs the first device to connect with the second device when the information on one or more devices includes the second device's information.

Furthermore, the advertising message may further include role information indicating the role of the first device when performing a connection with the second device.

Furthermore, if the information on one or more devices does not include the second device's information, the processor requests the first device to add the second device's information to the Whitelist.

Furthermore, the processor may instruct the first device to transmit an advertising message, a scan request message for requesting additional information on the second device, or a connection request message for connecting with the second device.

Furthermore, the processor may set the type of an advertising message the first device transmits to the second device.

Furthermore, the processor may set the parameter of an advertising message the first device transmits to the second device.

Furthermore, the parameter may include at least one of the duration for which the advertising message is transmitted, the interval of transmissions of the advertising message, or the channels over which the advertising message is transmitted.

Furthermore, the processor may set the parameter of a scan request message the first device transmits to the second device in order to request for additional information on the second device.

Furthermore, the parameters may include at least one of the duration for which the scan request message is transmitted, the interval of transmissions of the scan request message, or the channels over which the scan request message is transmitted.

Advantageous Effects

According to a method for controlling a device by using Bluetooth LE (Low Energy) technology according to an exemplary embodiment of the present invention, a connection between other devices may be controlled by means of a control device.

Furthermore, according to the present invention, a connection between other devices may be controlled by acquiring a list of devices these other devices can connect to by means of a control device by using Bluetooth LE (Low Energy) technology.

Furthermore, according to the present invention, a connection between other devices may be controlled by changing a list of devices these other devices can connect to by means of a control device by using Bluetooth LE (Low Energy) technology.

Furthermore, according to the present invention, devices with no display function may be connected by controlling a connection between other devices by means of a control device by using Bluetooth LE (Low Energy) technology.

Advantages which may be obtained in this specification are not limited to the aforementioned advantages, and various other advantages may be evidently understood by those skilled in the art to which the present invention pertains from the following description.

BRIEF DESCRIPTION OF THE DRAWINGS

FIG. 1 is a schematic view illustrating an example of a wireless communication system using a Bluetooth low energy technology to which the present invention is applicable.

FIG. 2 is an internal block diagram of an example of devices to which the present invention is applicable.

FIG. 3 is a view illustrating an example of a Bluetooth low energy topology.

FIG. 4 is a view illustrating an example of a Bluetooth communication architecture to which the present invention is applicable.

FIG. 5 is a view illustrating an example of a structure of a generic attribute profile (GATT) of Bluetooth low energy.

FIG. 6 is a flowchart illustrating a method for forming a device-to-device connection by using Bluetooth LE (Low Energy).

FIG. 7 is a view schematically illustrating a method for controlling the formation of a connection between other devices by means of a control device according to an exemplary embodiment of the present invention.

FIG. 8 is a view illustrating an example of the characteristics of a GATT (Generic Attribute Profile) for controlling a device by using Bluetooth LE (Low Energy) technology to which the present invention can be applied.

FIGS. 9 to 18 are views each illustrating an example of each characteristic to which the present invention can be applied.

FIG. 19 is a flowchart schematically illustrating an example of a method for controlling a connection between other devices by means of a control device to which the present invention can be applied.

FIG. 20 is a flowchart illustrating an example of a method for controlling a connection between other devices by means of a control device according to the present invention.

FIG. 21 is a flowchart illustrating another example of a method for controlling a connection between other devices by means of a control device according to the present invention.

FIG. 22 is a flowchart illustrating yet another example of a method for controlling a connection between other devices by means of a control device according to the present invention.

FIG. 23 is a flowchart illustrating a further example of a method for controlling a connection between other devices by means of a control device according to the present invention.

FIG. 24 is a flowchart illustrating a further example of a method for controlling a connection between other devices by means of a control device according to the present invention.

FIG. 25 is a flowchart illustrating a further example of a method for controlling a connection between other devices by means of a control device according to the present invention.

FIG. 26 is a flowchart illustrating a further example of a method for controlling a connection between other devices by means of a control device according to the present invention.

BEST MODE

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device transmits a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device transmits an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Also, a plurality of devices measuring exercising activities of human beings through a fitness equipment using a specific device have been presented, but a device transmitting measured exercising data through Bluetooth to show specific numerical values to users has not been introduced yet.

Thus, the present invention proposes a method for measuring human beings' exercising activities through the fitness equipment and transmitting and processing measured data through Bluetooth LE to provide the processed data to users.

FIG. 2 is an internal block diagram of an example of devices to which the present invention is applicable.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message there through.

The processors 114 and 124 may also be termed a controller, a control unit, and the like.

The processors 114 and 124 may include an application-specific integrated circuit (ASIC), other chipset, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As discussed above, in the BLE technology, a duty cycle is small and power consumption may be significantly reduced through a low data rate.

The user input interfaces 112 and 122 refer to modules providing a user input such as a screen button to the controllers to enable the user to control an operation of the devices.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

Device D is an advertiser and device A is an initiator (group D).

Device E is a scanner and Device C is an advertiser (group C).

Device H is an advertiser, and devices I and J are scanners (group H).

Device K is also an advertiser, and device N is an initiator (group K).

Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the O is an initiator. The device O may establish a connection with the device R. Here, the device O may be a slave of two devices and a master of one device at the same time.

FIG. 4 is a view illustrating an example of a Bluetooth communication architecture to which the present invention is applicable.

Referring to FIG. 4, (a) of FIG. 4 illustrates an example of a protocol stack of a Bluetooth basic rate (BR/enhanced data rate (EDR) that supports GATT (Generic Attribute Profile), and (b) of FIG. 4 illustrates an example of a protocol stack of Bluetooth low energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT)

43), a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

Battery: Battery information exchanging method
Time: Time information exchanging method
FindMe: Provision of alarm service according to distance
Proximity: Battery information exchanging method
Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising

PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 is a view illustrating an example of a structure of a generic attribute profile (GATT) of Bluetooth low energy.

Referring to FIG. 5, a structure for exchanging profile data of Bluetooth low energy may be looked through.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client transmits a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute

Type: Type of attribute

Value: Value of attribute

Permission: Right to access attribute

The present invention proposes a method in which a sensor measures and stores human activities by using a GATT-based operational structure of the Bluetooth LE, and a client retrieves the stored information from the sensor.

FIG. 6 is a flowchart illustrating a method for forming a device-to-device connection by using Bluetooth LE (Low Energy).

As illustrated in FIG. 6, for a Bluetooth LE connection between a first device 300 and a second device 400, the first device 300 transmits an advertising message to the second device (S6010).

As described above, the advertising message is used for a device to provide its own information to other devices by using Bluetooth LE, and may include various information including service information, user information, etc. provided by the device.

The second device 400 acknowledges the information included in the advertising message sent by the first device 300, and then transmits a connection request message to the first device 300 requesting for a Bluetooth LE connection (S6020). Then, the first device 300 and the second device 400 form a Bluetooth LE (Low Energy) connection (S6030).

With this method, however, the first device 300 and the second device 400 cannot connect with each other—or at least it may be difficult for them to do—and it is not possible to control the formation of connections, to check PIN numbers, and to control connection settings unless the first device 300 and/or the second device 400 has a UI (user interface).

Hence, in order to solve this problem, the present invention proposes a method for making a connection between the first device 300 and the second device 400 by using a third device having a UI capable of controlling a connection between devices as a control device for connection.

FIG. 7 is a view schematically illustrating a method for controlling the formation of a connection between other devices by means of a control device to which the present invention can be applied.

As illustrated in FIG. 7, a third device 500 is required in order to form a connection between a first device 300 and a second device 400, and a new control protocol is required in order for the third device 500 to control the first device 300 and the second device 400.

A control device which represents a device controlling the formation of a connection between the first device 300 and the second device 400 will be hereinafter referred to as the third device 500.

The third device 500 controls a connection between other devices (e.g., Bluetooth devices) without using an actual service or profile.

In order to control a connection state between other devices, the third device 500 needs to know these other devices' information (e.g., interface information, service information, etc.).

FIG. 8 is a view illustrating an example of the characteristics of a GATT (Generic Attribute Profile) for controlling a device by using Bluetooth LE (Low Energy) technology to which the present invention can be applied.

Descriptions of the characteristic included in a GATT Database which are listed in FIG. 8 are as follows:

Device State: It indicates Scanning, Standby, Advertising, Initiating, or Connection State which corresponds to a Link Layer State of a controlled device. A single state or multiple states may be designated as Device State. The de vice may be requested to perform the function of the state concerned through Write, the current state of the controlled device may be found out through Read, and a change in the state of the controlled device may be found out through Indication.

Advertising Duration: Time information related to a device's Advertising State operation. The corresponding value is meaningless if the device is in other states (it may include the concept of Advertising Interval).

Scanning Duration: Time information related to a device's Scanning State operation. The corresponding value is meaningless if the device is in other states (it may include the concept of Scanning Interval and/or Scanning Window).

Standby Duration: Time information related to a device's Standby State operation. The corresponding value is meaningless if the device is in other states.

Initiating Duration: Time information related to a device's Initiating State operation. The corresponding value is meaningless if the device is in other states.

Connection Duration: Time information related to a device's Connection State operation. The corresponding value is meaningless if the device is in other states (it may include the concept of Connection Event Interval, slave latency supervisionTimeout, and/or connection event Transmit Window (size, offset)).

Advertising Type: It defines a specific method of Advertising if a controlled device is requested to perform Advertising (it may set the PDU type of the above-mentioned Advertising Message).

Scanning Type: It defines a specific method of Scanning if a controlled device is requested to perform Scanning.

Device State Control Point: A characteristic for controlling a device's operating state.

Whitelst: It includes information on devices a controlled device can connect to, and, if required, can be extended to make connections with multiple devices.

Whitelist Control Point: A function for controlling the management of a Whitelist managed by a controlled device.

Advertising Filter Policy: It defines a method of using a Whitelist at a Link Layer of an Advertiser.

Scanning Filter Policy: It defines a method of using a Whitelist at a Link Layer of a Scanner.

Initiator Filter Policy: It defines a method of using a Whitelist at a Link Layer of an Initiator.

Connected Service Type: A communication technology method supported by a device (e.g., Wi-Fi, Ethernet, Bluetooth BR/EDR, Bluetooth LE, etc.) and the Service Type (including an application).

FIGS. 9 to 18 are views each illustrating an example of each characteristic to which the present invention can be applied.

FIG. 9 illustrates an example of the Device State included in the characteristics listed in FIG. 8. As shown in (a) of FIG. 10, the types of the Device State may be divided into Current Device States, which indicates the current state of a device, and Operated Device States, which indicates operable states of the device, which may be distinguished by the Mode of (b) of FIG. 9. For example, if the Mode has a value of '0', it indicates Current Device State, and if the Mode has a value of '1', it indicates Operated Device States.

In this case, if the Mode indicates Current Device State, information on only one state indicating the current state of the device may be provided, and if the Mode indicates Operated Device States, information on a number of states in which the device is currently operable may be provided.

For example, if the Mode indicates Current Device State, only one of the bits indicating the device states listed in (b) of FIG. 9 may be used (the value of a specific bit indicating a state may be '1'), and if the Mode indicates Operated Device States, a number of bits may be used (the value of multiple bits may be '1').

FIG. 10 illustrates the Duration-related characteristics included in the characteristics listed in FIG. 8. As shown in (a) of FIG. 10, the Duration-related characteristics may include Scanning Duration, Standby Duration, Advertising Duration, Initiating Duration, and Connecting Duration.

The characteristics listed in (a) of FIG. 10 may have the format shown in (b) of FIG. 10. The "Mode" field in (b) of FIG. 10 indicates whether the Duration has the maximum value or minimum value; for example, if the "Mode" field has a value of '01', the Duration has the maximum value, or if the "Mode" field has a value of '10', the Duration has the minimum value.

The "Time Values" field is a field indicating the actual value of the Duration. If the Duration is 64 bits, the first 32 bits may indicate the maximum value, and the remaining 32 bits may indicate the minimum value, in which case the "Mode" field may not be included.

FIGS. 11 and 12 illustrate the Advertising- and Scanning-related characteristics. The Advertising Duration and Scanning Duration described in FIG. 10 are part of the Advertising- and Scanning-related characteristics.

The Advertising- and Scanning-related characteristics listed in FIGS. 11 and 12 are characteristics that can be used in the present invention, though not shown in FIG. 8. These characteristics may have the format shown in (b) of FIG. 10.

FIG. 13 illustrates the characteristics related to channels used in an Advertising or Scanning procedure. As shown in FIG. 13, the 7th bit and 6th bit of the Channel Info characteristic indicate whether the information in the characteristic is used for Advertising or Scanning. For example, if the 7th bit has a value of '1' and the 6th bit has a value of '0', the channel information in the Channel Info may be used for Advertising.

The 5th bit, 4th bit, and 3rd bit indicate in which order the channels indicated by the 2nd bit, 1st bit, and 0th bit are used. For example, if the 5th bit has a value of '1' and the 4th and 3rd bit have a value of '0', the channels indicated by the 2th bit, 1th bit, and 0th bit are used in an arbitrary order.

FIG. 14 illustrates the Connection-related characteristics. The characteristics listed in FIG. 14, except Connection Duration, can be used in the present invention, though not shown in FIG. 8.

The 'Connection Interval', 'Connection Window', and 'Connection Duration' may have the format shown in (b) of FIG. 10. The "Mode" field in (b) of FIG. 10 indicates whether these characteristics have the maximum value or minimum value; for example, if the "Mode" field has a value of '01', these characteristics have the maximum value, or if the "Mode" field has a value of '10', these characteristics have the minimum value.

The "Time Values" field is a field indicating the actual value of the Duration. If the Duration is 64 bits, the first 32 bits may indicate the maximum value, and the remaining 32 bits may indicate the minimum value, in which case the "Mode" field may not be included.

(a) of FIG. 15 shows a concrete format of 'Advertising Type' of FIG. 8, and (b) of FIG. 15 shows a concrete format of 'Scanning Type' of FIG. 8.

In (a) of FIG. 15, a control device may set the Type of an Advertising Message a controlled device transmits when it is advertising, and in (b) of FIG. 15, the control device may set whether the controlled device will perform Passive Scanning or Active Scanning when the controlled device is Scanning.

FIG. 16 illustrates an example of 'Device Status Control Point' included in the characteristics listed in FIG. 8. A control device may control a device by instructing the device to perform a specific operation through the 'Device Status Control Point' characteristic.

The operations of the 'Device Status Control Point' characteristic shown in FIG. 16 may be defined as follows:
Execute: The device provides the states defined in Device States (The device may provide a plurality of states)
Advertising Start: Starts the corresponding operation if the device is not advertising
(Starts the Corresponding Function Immediately and/or Enables the Corresponding Function if the Corresponding State in Device States is Disabled)
Advertising Stop: Stops the corresponding operation if the device is advertising
(Stops the Corresponding Function Immediately and/or Disables the Corresponding Function if the Corresponding State in Device States is Abled)
Scanning Start: Starts the corresponding operation if the device is not scanning
(Starts the Corresponding Function Immediately and/or Enables the Corresponding Function if the Corresponding State in Device States is Disabled)
Scanning Stop: Stops the corresponding operation if the device is advertising
(Stops the Corresponding Function Immediately and/or Disables the Corresponding Function if the Corresponding State in Device States is Abled)
Initiating Request: Sets up a connection with Peer Device
Initiating Stop: Terminates a connection with Peer Device
Refresh Bonding: Refreshes Bonding information (or deletes Bonding information)
Refresh Security: Re-performs a security procedure (authentication, authorization, and encryption between two devices) and refreshes information (key values for each stage of the security procedure)

FIG. 17 illustrates an example of 'Whitelist Control Point' included in the characteristics listed in FIG. 8. A control device may change the Whitelist of a controlled device through this characteristic.

Through the 'Whitelist Control Point', the control device may add or delete a particular device to or from the 'Whitelist' or deliver information on the 'Whitelist' to other devices or fetch it to the control device.

The Whitelist indicates information on connectable devices. A controlled device may make a connection with the devices included in the Whitelist.

The operations of the 'Whitelist Control Point' characteristic shown in FIG. 17 may be defined as follows:
Clear Whitelist: Clear information on all devices in Whitelist
Add in Whitelist: Add particular device's information to Whitelist
Delete in Whitelist: Delete particular device's information from Whitelist
Transmit White Whitelist: Deliver its own Whitelist information
Receive Whitelist: Receive Whitelist information from the other device FIG. 18 illustrates an example of 'Advertising Filter Policy', 'Scanning Filter Policy', and 'Initiating Filter Policy' included in the characteristics listed in FIG. 8. A control device may set whether to use Whitelist for a controlled device's Advertising, Scanning, and Initiating operations or not through this characteristic.

If 'Advertising Filter Policy' is Connectable directed advertising, Whitelist may not be used.

As illustrated in FIG. 18, a control device may set whether to apply Whitelist when a controlled device performs a specific operation. For example, if the control device sets the 3rd bit of the characteristic to '1', the Whitelist may be applied when the controlled device performs Advertising so that an Advertising message is only sent to the devices included in the Whitelist.

FIG. 19 is a flowchart schematically illustrating an example of a method for controlling a connection between other devices by means of a control device to which the present invention can be applied.

Referring to FIG. 19, a control device may set the characteristic values of a controlled device so that the controlled device makes a connection with a particular device.

Specifically, a third device, which is a control device, receives an advertising message from a first device, which is a controlled device (S19010). The advertising message may be represented as an advertising PDU (pack data unit), an advertising packet, an advertisement, an advertising frame, an advertising physical channel PDU, etc.

The advertising message may include information on services provided by the first device, information related to the first device, and information on the role of the first device.

Having acquired the first device's information through the advertising message, the third device makes a Bluetooth LE connection by transmitting a connection request message to the first device (S19020).

The third device, connected to the first device via Bluetooth LE, may set the characteristic values of the first device so that the first device can connect with another device (S19030).

The characteristic values may be the characteristic values shown in FIGS. 8 to 18.

Afterwards, the third device may instruct the first device to make a connection with another device based on the set characteristic values (S19040), and the first device makes a connection with another device based on the set characteristic values.

In this case, the first device may make a connection by other network communication technologies (e.g., Wi-Fi, NFC, Wi-Fi Direct, and Bluetooth BR/EDR), as well as by Bluetooth LE.

With this method, the third device may control the first device to connect with another device even if the first device has no UI.

FIG. 20 is a flowchart illustrating an example of a method for controlling a connection between other devices by means of a control device according to the present invention.

Referring to FIG. 20, the third device, which is a control device, may control the first device to make a connection with the second device by setting the characteristics related to the state of the first device, which is a controlled device.

Specifically, the third device 500 may receive an advertising message from the first device (S20010).

The advertising message may be represented as an advertising PDU (pack data unit), an advertising packet, an advertisement, an advertising frame, an advertising physical channel PDU, etc.

The advertising message may include information on services provided by the first device, information related to the first device, and information on the role of the first device.

If the first device 300 supports service related to connection control, the first device 300 may transmit the advertising message, including service information related to connection control.

Based on the first device 300's information acquired from the advertising message, the third device 500 transmits a connection request message to the first device 300 in order to connect with the first device 300 via Bluetooth LE (S20020).

Having connected with the first device 300 through the connection request message, the third device 500 requests the first device 300 to write in the 'Device State' characteristic shown in FIGS. 8 and 9, in order to set the state of the first device 300 (S20030).

The 'Device State' is a characteristic that indicates a state in which the device is currently operating or operable, as described in FIG. 10.

The following description will be given with respect to an example in which the third device 500 requests the first device 300 to write '1' as the 0th bit and 2nd bit of the 'Device State' characteristic through the step S20030—that is, the third device 500 sets the first device 300 to perform Scanning and Advertising.

Afterwards, the third device 500 requests the first device 300 to write in the 'Scanning Duration' in order to set the duration for which the first device 300 performs Scanning (S20040).

As shown in FIGS. 8, 10, and 12, the 'Scanning Duration' may be set in a way that the first device 300 performs Scanning for a set duration.

With this method, Scanning Interval, Scan Window, Number of Scanning Events, etc., as well as Scanning Duration, may be set.

Afterwards, the third device 500 requests the first device 300 to write in the 'Advertising Duration' in order to set the duration for which the first device 300 performs Advertising (S20050).

Through the 'Advertising Duration', the first device 300 may be set to perform Advertising during the set duration, as described in FIGS. 8, 10, and 11.

With this method, Advertising Interval, Advertising Window, Number of Advertising Events, etc., as well as Advertising Duration, may be set.

Having set the characteristics related to the first device 300's connection, the third device 500 requests the first device 300 to write in the '0x06' of the 'Device State Control Point' characteristic, in order to instruct the first device 300 to make a connection with the second device 400 (S20060).

Afterwards, the first device 300 makes a connection with the second device 400 by performing Scanning and Advertising, as set by the third device 500.

FIG. 21 is a flowchart illustrating another example of a method for controlling a connection between other devices by means of a control device according to the present invention.

Referring to FIG. 21, the third device, which is a control device, may control the first device to perform Advertising by setting the characteristics related to the Advertising of the first device, which is a controlled device.

Firstly, the steps S21010 and S21020 of FIG. 21 are identical to the steps S20010 and S20020 of FIG. 20, so descriptions thereof will be omitted.

Having connected with the first device 300, the third device 500 may transmit a write request to the first device 300 in order to set the Advertising Parameters shown in FIGS. 8 and 11 included in the characteristics of the GATT.

For example, the third device 500 may request the first device 300 to write in the Advertising Interval and 'Advertising Event' characteristics, in order to set the interval and number of transmissions of an advertising message from the first device 300 (S21030).

Afterwards, the third device 500 may request the first device 300 to write in the 'Advertising Type' and 'Advertising Channel' characteristics, in order to set the type of an advertising message from the first device 300 and the channels over which advertising is performed (S21040 and S21050).

As such, having set the type, interval, and number of transmissions of an advertising message from the first device 300 and the channels over which the advertising message is sent, the third device 500 may instruct the first device 300 to perform Advertising. That is, the third device 500 requests the first device 300 to write in the '0x02' of the Device State Control Point' characteristic (S21060).

FIG. 22 is a flowchart illustrating yet another example of a method for controlling a connection between other devices by means of a control device according to the present invention.

Referring to FIG. 22, the third device, which is a control device, may control the first device to perform Scanning by setting the characteristics related to the Scanning of the first device, which is a controlled device.

Specifically, the third device 500 may receive an advertising message from the second device 400 (S22010).

The advertising message may be represented as an advertising PDU (pack data unit), an advertising packet, an advertisement, an advertising frame, an advertising physical channel PDU, etc.

The advertising message may include information on services provided by the first device, information related to the first device, and information on the role of the first device.

If the second device 400 supports service related to connection control, the second device 400 may transmit the advertising message, including service information related to connection control.

Based on the second device 400's information acquired from the advertising message, the third device 500 transmits a connection request message to the second device 400 in order to connect with the second device 400 via Bluetooth LE (S22020).

Having connected with the second device 400, the third device 500 may transmit a write request to the second device 400 in order to set the Scanning Parameters shown in FIGS. 8, 12, and 15 included in the characteristics of the GATT.

For example, the third device 500 may request the second device 400 to write in the 'Scanning Interval' and 'Scanning Event' characteristics, in order to set the interval and number of scanning operations of the second device 400 (S22030).

Afterwards, the third device 500 may request the second device 300 to write in the 'Scanning Type' and 'Scanning Channel' characteristics, in order to set the type of Scanning of the second device 400 and the channels over which scanning is performed (S22040 and S22050).

As such, having set the type, interval, and number of scanning operations of the second device 400 and the channels over which scanning is performed, the third device 500 may instruct the second device 400 to perform Scanning. That is, the third device 500 requests the second device 400 to write in the '0x03' of the Device State Control Point' characteristic (S22060).

Afterwards, the second device 400 performs scanning as set by the third device 500. For example, scanning may be performed during the Scanning Window out of the Scanning Interval but may not be performed during the remaining time.

Afterwards, when stopping the scanning of the second device 400, the third device 500 may request to stop the scanning of the second device 400 by requesting the second device 400 to write in the 0x04' of the Device State Control Point' characteristic (S22070).

FIG. 23 is a flowchart illustrating a further example of a method for controlling a connection between other devices by means of a control device according to the present invention.

Referring to FIG. 23, the third device, which is a control device, may control the first device to make a connection with the second device by setting the characteristics related to the Connection of the first device, which is a controlled device.

Firstly, the steps S23010 and S23020 of FIG. 23 are identical to the steps S20010 and S20020 of FIG. 20, so descriptions thereof will be omitted.

Having connected with the first device 300, the third device 500 may transmit a write request to the first device 400 in order to set the Connection Parameters shown in FIGS. 8 and 14 (S23030).

For example, the third device 500 may request the first device 300 to write in the 'Peer Device', 'Connection Interval', and 'Connection Event' characteristics, among the Connection Parameters shown in FIG. 14.

Afterwards, the third device 500 requests the first device 300 to write in the '0x06 of the 'Device State Control Point' characteristic, in order to instruct the first device 300 to perform an Initiating operation with a device (hereinafter, a second device) set in the 'Peer Device' (S23040).

Afterwards, the first device 300 is connected to the second device 400 by performing an Initiating operation according to the settings of the Connection Parameters of the third device 500 (S23050).

FIG. 24 is a flowchart illustrating a further example of a method for controlling a connection between other devices by means of a control device according to the present invention.

Referring to FIG. 24, the third device, which is a control device, may control the first and second devices, which are controlled devices, to connect with each other by setting the Advertising and Scanning Types of the first and second devices.

Firstly, the step S24010 of FIG. 24 is identical to the step S20010 of FIG. 20 and the steps S24020 and S24030 of FIG. 24 are identical to the steps S22010 and S22020 of FIG. 22, so descriptions thereof will be omitted.

Afterwards, having acquired the first device's information through the step S24010, the third device 500 transmits a connection request message to the first device in order to make a connection with the first device 300 via Bluetooth LE (S24040).

The third device 500, connected to the first device 300 and the second device 400 via Bluetooth LE, requests the first device 300 to write in the 'Advertising Type' characteristic shown in FIG. 15 in order to set the Type of Advertising of the first device 300 (524050).

In this embodiment, the Advertising Parameters of FIG. 11, as well as the 'Advertising Type' characteristic, may be used, and may operate with a default value if there is no particular setting procedure.

Afterwards, the third device 500 requests the second device 400 to write in the 'Scanning Type' characteristic shown in FIG. 15 in order to set the type of Scanning of the second device 400 (S24060). As explained in FIG. 15, the third device 500 may set whether the second device 400 will perform Passive Scanning or Active Scanning through the 'Scanning Type' characteristic.

In this embodiment, the Scanning Parameters of FIG. 12, as well as the 'Scanning Type' characteristic, may be used, and may operate with a default value if there is no particular setting procedure.

Also, based on the set 'Scanning Type' and the Whitelist' or 'Peer Device' information shown in FIG. 8, various connection setting operations, for example, Auto, General, Selective, and Direction Connection, may be performed.

Afterwards, the first device 300 and the second device 400 perform Advertising and Scanning as set by the third device 500.

For example, the first device 300 transmits an advertising message to the second device 400 according to the Type set by the third device 500 (S24070), and if the second device 400 is performing 'Active Scanning' as set by the third device 500, it transmits a connection request message to the first device 30 (S24080).

FIG. 25 is a flowchart illustrating a further example of a method for controlling a connection between other devices by means of a control device according to the present invention.

Referring to FIG. 25, the third device, which is a control device, may control the first device's connection by setting a list of devices the first device, which is a controlled device, can connect to.

Firstly, the steps S25010 and S25020 of FIG. 25 are identical to the steps S20010 and S20020 of FIG. 20, so descriptions thereof will be omitted.

Having connected with the first device 300, the third device 500 requests the first device 300 to read the Whitelist' characteristic, in order to receive information on devices the first device 300 can connect to (S25030).

The 'Whitelist' includes information on devices the first device 300 can connect to, and the first device 300 may perform the above-described Advertising, Scanning, or Initiating with one or more devices included in the 'Whitelist'.

Having been requested by the third device 500 to read the Whitelist' characteristic, the first device 300 transmits information on one or more devices included (or registered) in the 'Whitelist' to the third device 500 (S25040). In this case, the information on one or more devices included (or registered) in the 'Whitelist' may be sent through a read response message or L2CAP channel.

Once the 'Whitelist' information of the first device 300 is acquired, but without the second device 400 included (or registered) in the 'Whitelist', the third device 500 requests the first device 300 to write in the 'Whitelist Control Point' characteristic shown in FIGS. 8 and 17, in order to include (or register) the second device 400's information in the 'Whitelist' (S25050).

That is, the third device 500 may include the second device's information in the 'Whitelist' by requesting the first device 300 to write in the '0x02' of the 'Whitelist Control Point' characteristic.

Afterwards, the third device 500 requests the first device 300 to write in the '3rd bit' of the 'Filter Policy' characteristic shown in FIGS. 8 and 18 so that the first device 300 and the second device 400 can automatically connect with each other (S25060).

Through the '3rd bit' of the 'Filter Policy' characteristic, the first device 300 may receive an advertising message only from the devices included in the 'Whitelist' when performing Initiating.

Afterwards, once an advertising message is sent from the second device 400 (S25070), the first device 300 may receive it and perform Initiating by transmitting a connection request message to the second device 400 (S25080).

In another exemplary embodiment of the present invention, a connection may be controlled through a Blacklist, which is the opposite of the Whitelist.

That is, the third device 500 may control the first device 300 and/or second device 400's connection by adding or deleting a particular device's information to or from a 'Blacklist' including information on one or more devices the first device 300 and/or second device 400 cannot connect to.

For example, the first device 300 and/or second device 400 cannot connect with a particular device by including (or registering) the particular device's information in the 'Blacklist' characteristic of the first device 300 and/or second device 400.

FIG. 26 is a flowchart illustrating a further example of a method for controlling a connection between other devices by means of a control device according to the present invention.

Referring to FIG. 26, the third device, which is a controlled device, may set the duration for which the first device, which is a controlled device, performs Advertising, and the first device may connect with the second device by performing Advertising during the set duration.

Firstly, the steps S27010 and S27020 of FIG. 26 are identical to the steps S20010 and S20020 of FIG. 20, so descriptions thereof will be omitted.

Afterwards, the third device may request the first device to write in the 'Advertising Duration' characteristic shown in FIGS. 8 and 10, in order to set the duration for which the first device performs Advertising (S27030).

In this case, the third device 500 may set the 'Advertising Duration' to a certain length of time, for example, from AM 3:00 to AM 3:10.

Having been requested by the third device 500 to write in the 'Advertising Duration', the first device 300 may set the 'Advertising Duration' as requested and perform Advertising by transmitting an advertising message during the set duration (S27040).

The first device 300 may receive connection request messages from other devices during the set 'Advertising Duration', but receive no connection request messages from other devices and operate in Sleep Mode at other times.

If the second device 400 receives an advertising message from the first device 300 during the 'Advertising Duration' and the first device 300's information is included (or registered) in the 'Whitelist' of the second device 400, the second device 400 may transmit a connection request message to the first device 300 to connect with the first device 300 via Bluetooth LE (S27050).

However, if the first device 300's information is not included (or registered) in the 'Whitelist' of the second device 400, the second device 400 may not transmit a connection request message or scan request message even if it receives an advertising message from the first device 300.

In another exemplary embodiment of the present invention, the first device 300 and/or second device 400's connection may be controlled by adding and/or deleting a particular device's information to and/or from the 'Blacklist' explained in FIG. 25.

For example, in the exemplary embodiment of FIG. 26, if the first device's information is included (or registered) in the 'Blacklist' of the second device 400, the second device 400 may not transmit to the first device 300 a connection request message for connection or a scan request message for requesting for additional information, even if it receives an advertising message from the first device 300.

The present invention described as above is not limited by the aforementioned exemplary embodiments and the accompanying drawings because it will be apparent to those skilled in the art that various substitutions, modifications, and changes can be made within the scope without departing from the technical spirit of the present invention.

The invention claimed is:

1. A method for a third device to control a connection between a first device and a second device by using Bluetooth Low Energy (LE) technology, the method comprising:

receiving, from the first device, a first advertising message including first role information;

receiving, from the second device, a second advertising message including second role information, wherein the first role information and the second role information indicates a role of a device in a procedure for establishing the connection;

connecting with the first device based on the first advertising message by using a Bluetooth LE connection;

connecting with the second device based on the first and second advertising messages by using a Bluetooth LE connection;

transmitting, to the first device, a first write request message requesting for writing a first characteristic value based on the first role information through the Bluetooth LE connection; and transmitting, to the second device, a second write request message requesting for writing a second characteristic value based on the second role information through the Bluetooth LE connection, wherein a first operation mode of the first device and a second operation mode of the second device are respectively set based on the first characteristic value and the second characteristic value, wherein the first operation mode and the second operation mode are related to message transmission and reception timing of the first device and the second device, and wherein the connection between the first device and the second device is established based on the first operation mode and the second operation mode set by the third device.

2. The method of claim 1, wherein each of the first advertising message and the second advertising message further includes service information, and
wherein the service information indicates type of services supported by a device transmitting an advertising message.

3. The method of claim 1, wherein the role is one of an advertise or scanner.

4. The method of claim 1, further comprising:
instructing the first device to transmit an advertising message, a scan request message for requesting additional information on the second device, or a connection request message for connecting with the second device.

5. The method of claim 4, wherein the first characteristic value d includes information for a type of an advertising message transmitted by the first device to the second device when the first device is an advertiser.

6. The method of claim 5, wherein the first characteristic value includes a parameter of an advertising message transmitted by the first device to the second device.

7. The method of claim 6, wherein the parameter of the advertising message includes at least one of a duration for which the advertising message is transmitted, an interval of transmissions of the advertising message, or channels over which the advertising message is transmitted.

8. The method of claim 4, further comprising:
setting a parameter of a scan request message the first device transmits to the second device in order to request for additional information on the second device.

9. The method of claim 8, wherein the parameter of the scan request message includes at least one of a duration for which the scan request message is transmitted, an interval of transmissions of the scan request message, or channels over which the scan request message is transmitted.

10. A third device for controlling a connection between a first device and a second device by using Bluetooth Low Energy (LE) technology, the third device comprising:
a transceiver; and
a processor functionally connected to the transceiver, wherein the processor:
controls the transceiver to receive, from the first device, a first advertising message including first role information,
receives, from the second device, a second advertising message including second role information,
wherein the first role information and the second role information indicates a role of a device in a procedure for establishing the connection,
connects with the first device based on the first advertising message by using a Bluetooth LE connection,
connects with the second device based on the first and second advertising messages by using a Bluetooth LE connection,
controls the transceiver to transmit, to the first device, a first write request message requesting for writing a first characteristic value based on the first role information through the Bluetooth LE connection, and
transmits, to the second device, a second write request message requesting for writing a second characteristic value based on the second role information through the Bluetooth LE connection,
wherein a first operation mode of the first device and a second operation mode of the second device are respectively set based on the first characteristic value and the second characteristic value,
wherein the first operation mode and the second operation mode are related to message transmission and reception timing of the first device and the second device, and
wherein the connection between the first device and the second device is established based on the first operation mode and the second operation mode set by the third device.

11. The device of claim 10, wherein each of the first advertising message and the second advertising message further includes service information, and
wherein the service information indicates type of services supported by a device transmitting an advertising message.

12. The device of claim 10, wherein the role is one of an advertise or scanner.

13. The device of claim 10, wherein the processor instructs the first device to transmit an advertising message, a scan request message for requesting additional information on the second device, or a connection request message for connecting with the second device.

14. The device of claim 13, wherein the first characteristic value includes information for a type of an advertising message transmitted by the first device to the second device when the first device is an advertiser.

15. The device of claim 14, wherein the first characteristic value includes a parameter of an advertising message transmitted by the first device to the second device.

16. The device of claim 15, wherein the parameter of the advertising message includes at least one of a duration for which the advertising message is transmitted, an interval of transmissions of the advertising message, or channels over which the advertising message is transmitted.

17. The device of claim 13, wherein the processor sets a parameter of a scan request message the first device transmits to the second device in order to request for additional information on the second device.

18. The device of claim 17, wherein the parameter of the scan request message includes at least one of a duration for which the scan request message is transmitted, an interval of transmissions of the scan request message, or channels over which the scan request message is transmitted.

* * * * *